(12) United States Patent
Lin et al.

(10) Patent No.: US 9,186,834 B2
(45) Date of Patent: Nov. 17, 2015

(54) INJECTION MOLDING MACHINE WITH A SYNCHRONOUS POWER AUXILIARY MECHANISM

(71) Applicants: Jung-Teng Lin, Tainan (TW); Hsin-Ping Wang, Tainan (TW); Hou-An Lin, Tainan (TW); Tzu-Tse Wu, Tainan (TW)

(72) Inventors: Jung-Teng Lin, Tainan (TW); Hsin-Ping Wang, Tainan (TW); Hou-An Lin, Tainan (TW); Tzu-Tse Wu, Tainan (TW)

(73) Assignee: Chuan Lih Fa Machinery Works Co., Ltd., Tainan (TW)

( * ) Notice: Subject to any disclaimer, the term of this patent is extended or adjusted under 35 U.S.C. 154(b) by 354 days.

(21) Appl. No.: 13/906,406

(22) Filed: May 31, 2013

(65) Prior Publication Data

US 2014/0356476 A1 Dec. 4, 2014

(51) Int. Cl.
*B29C 45/76* (2006.01)

(52) U.S. Cl.
CPC ... *B29C 45/7666* (2013.01); *B29C 2945/76511* (2013.01); *B29C 2945/76521* (2013.01); *B29C 2945/76692* (2013.01); *B29C 2945/76709* (2013.01); *B29C 2945/76859* (2013.01); *B29C 2945/76866* (2013.01)

(58) Field of Classification Search
CPC ............... B29C 45/7666; B29C 2945/76511; B29C 2945/76521; B29C 2945/76692; B29C 2945/76709; B29C 2945/76859; B29C 2945/76866

See application file for complete search history.

(56) References Cited

U.S. PATENT DOCUMENTS 6,142,760 A * 11/2000 Niizeki et al. ................. 425/145

* cited by examiner

*Primary Examiner* — James Mackey
(74) *Attorney, Agent, or Firm* — Alan D. Kamrath; Kamrath IP Lawfirm, P.A.

(57) ABSTRACT

A injection molding machine includes a power device including a movable plate, a primary motorized cylinder having a primary threaded rod screwed through the movable plate, a secondary motorized cylinder having a secondary threaded rod screwed through the movable plate, a first starter mounted on the primary motorized cylinder and connected with a controller, and a second starter mounted on the secondary motorized cylinder and connected with the controller. The second starter contains a bias factor command and a preset output command. Thus, the normal torque output of the secondary motorized cylinder is close to that of the primary motorized cylinder by control of the bias factor command, and the preset output command limits and prevents the normal torque output of the secondary motorized cylinder from being greater than that of the primary motorized cylinder.

7 Claims, 7 Drawing Sheets

INJECTION MOLDING MACHINE WITH A SYNCHRONOUS POWER AUXILIARY MECHANISM

BACKGROUND OF THE INVENTION

1. Field of the Invention

The present invention relates to an injection molding machine and, more particularly, to a plastic injection molding machine.

2. Description of the Related Art

Figure 1:
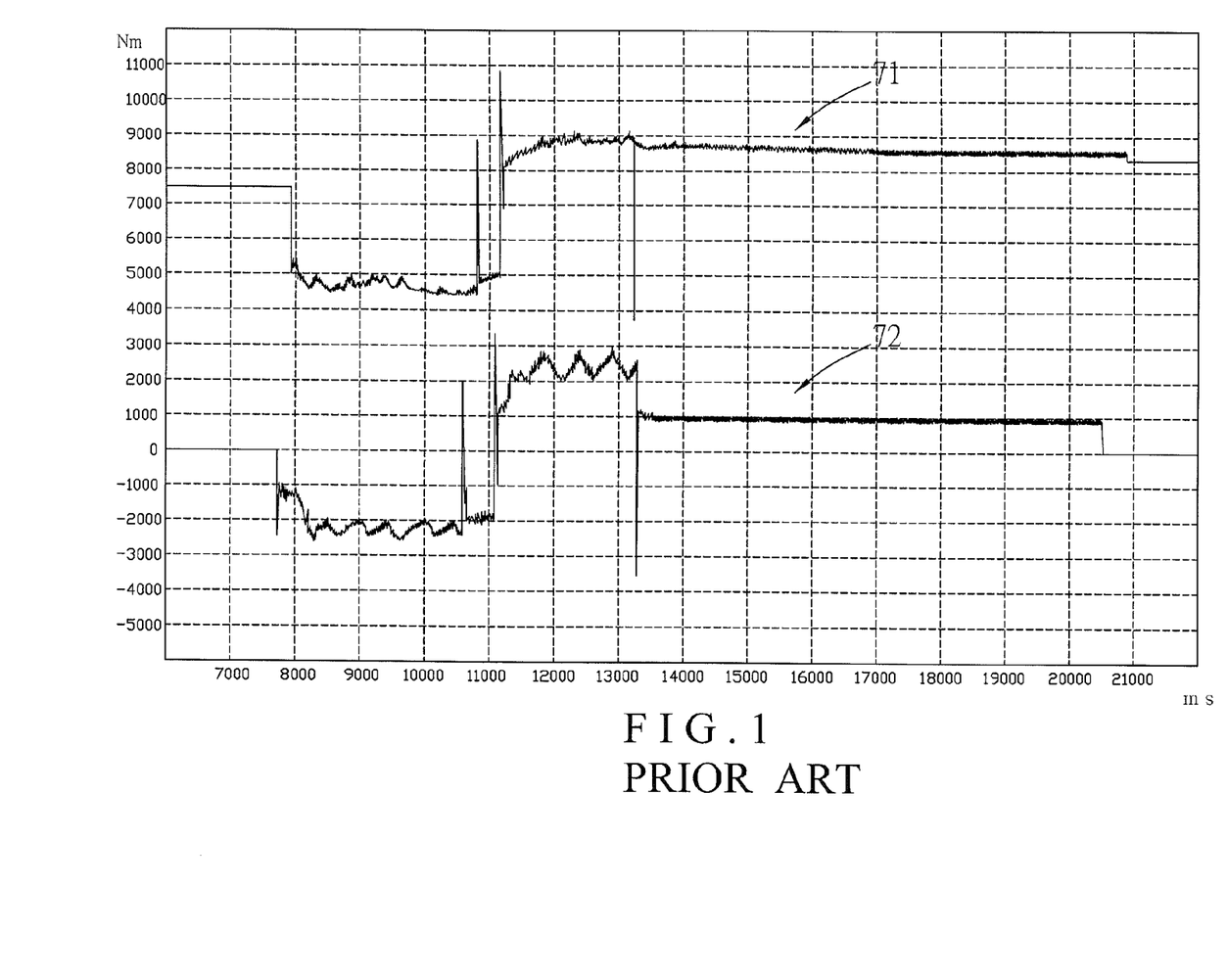
FIG. 1 is a graph showing the torque of the primary motorized cylinder and the secondary motorized cylinder of a conventional injection molding machine in accordance with the prior art.

A conventional injection molding machine in accordance with the prior art shown in FIG. 1 comprises a power device and a die assembly connected with the power device. The power device includes a movable plate having a first screw hole and a second screw hole, a primary motorized cylinder 71 having a primary threaded shaft screwed through the first screw hole of the movable plate, and a secondary motorized cylinder 72 having a secondary threaded shaft screwed through the second screw hole of the movable plate. In operation, the primary motorized cylinder 71 and the secondary motorized cylinder 72 are driven by a driver to rotate the primary threaded shaft and the secondary threaded shaft. In such a manner, the movable plate is moved by rotation of the primary threaded shaft of the primary motorized cylinder 71 and the secondary threaded shaft of the secondary motorized cylinder 72 to drive the die assembly so as to close or open the die assembly. The conventional injection molding machine further comprises a processor to calculate some factors. The factors include a ratio of the position, torque and speed of the primary threaded shaft of the primary motorized cylinder 71 and the secondary threaded shaft of the secondary motorized cylinder 72. Thus, the processor calculates the factors to control the torque output of the primary threaded shaft of the primary motorized cylinder 71 and the secondary threaded shaft of the secondary motorized cylinder 72. However, each of the factors of the primary motorized cylinder 71 and the secondary motorized cylinder 72 exists a tolerance so that the total tolerance of all of the factors will produce a greater differential between the torque output values of the primary motorized cylinder 71 and the secondary motorized cylinder 72. Thus, the primary threaded shaft of the primary motorized cylinder and the secondary threaded shaft of the secondary motorized cylinder are easily deflected due to the differential between the torque output values of the primary motorized cylinder and the secondary motorized cylinder, thereby affecting operation of the injection molding machine. As shown in FIG. 1, a graph of the torque of the primary motorized cylinder 71 and the secondary motorized cylinder 72 is drafted, wherein the horizontal coordinate indicates the time, and the vertical coordinate indicates the distance of displacement. The unit of the time is millisecond (ms), and the unit of the distance of displacement is nanometer (Nm). It is clear that the normal torque output values of the primary motorized cylinder 71 and the secondary motorized cylinder 72 have a greater differential.

BRIEF SUMMARY OF THE INVENTION

The primary objective of the present invention is to provide an injection molding machine with a synchronous power auxiliary mechanism.

In accordance with the present invention, there is provided an injection molding machine comprising a power device. The power device includes a movable plate having a first screw hole and a second screw hole, a primary motorized cylinder having a primary threaded rod screwed through the first screw hole of the movable plate, a secondary motorized cylinder having a secondary threaded rod screwed through the second screw hole of the movable plate, a first starter mounted on the primary motorized cylinder and electrically connected with a controller, and a second starter mounted on the secondary motorized cylinder and electrically connected with the controller. The second starter of the secondary motorized cylinder contains a bias factor command and a preset output command to control a normal torque output of the secondary motorized cylinder. The bias factor command and the preset output command of the second starter are added and controlled by the controller.

According to the primary advantage of the present invention, the controller controls the primary motorized cylinder and the secondary motorized cylinder to operate synchronously and to have the same normal torque output.

According to another advantage of the present invention, the normal torque output of the secondary motorized cylinder is close to that of the primary motorized cylinder by control of the bias factor command, and the preset output command limits and prevents the normal torque output of the secondary motorized cylinder from being greater than that of the primary motorized cylinder, so that the movable plate is driven by the primary threaded rod of the primary motorized cylinder and the secondary threaded rod of the secondary motorized cylinder to translate to a preset position precisely and quickly so that the die assembly is opened or closed exactly and steadily.

According to a further advantage of the present invention, the normal torque output values of the primary motorized cylinder and the secondary motorized cylinder are controlled easily by the controller.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 2-5, an injection molding machine in accordance with the preferred embodiment of the present invention comprises a power device 1.

Figure 2:
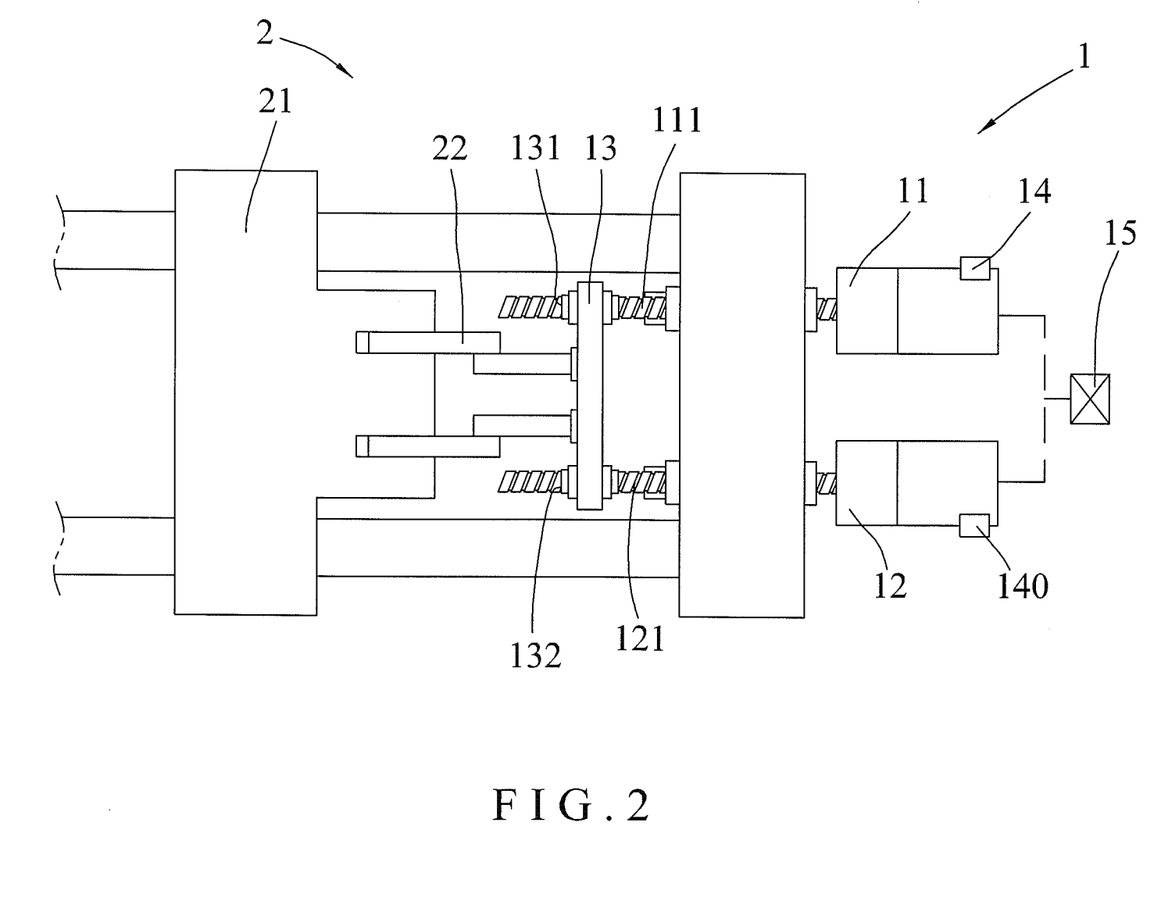
FIG. 2 is a plane view of an injection molding machine in accordance with the preferred embodiment of the present invention.

The power device 1 includes a movable plate 13 having a first screw hole 131 and a second screw hole 132, a primary motorized cylinder 11 having a primary threaded rod 111 screwed through the first screw hole 131 of the movable plate 13, a secondary motorized cylinder 12 having a secondary threaded rod 121 screwed through the second screw hole 132 of the movable plate 13, a first starter 14 mounted on the primary motorized cylinder 11 and electrically connected with a controller 15, and a second starter 140 mounted on the secondary motorized cylinder 12 and electrically connected with the controller 15.

The second starter 140 of the secondary motorized cylinder 12 contains a bias factor command 4 (see FIG. 4) and a preset output command 5 to control a normal torque output of the secondary motorized cylinder 12. The bias factor command 4 and the preset output command 5 of the second starter 140 are added and controlled by the controller 15. The primary threaded rod 111 of the primary motorized cylinder 11 is driven by the normal torque output of the primary motorized cylinder 11, and the secondary threaded rod 121 of the secondary motorized cylinder 12 is driven by the normal torque output of the secondary motorized cylinder 12.

Figure 4:
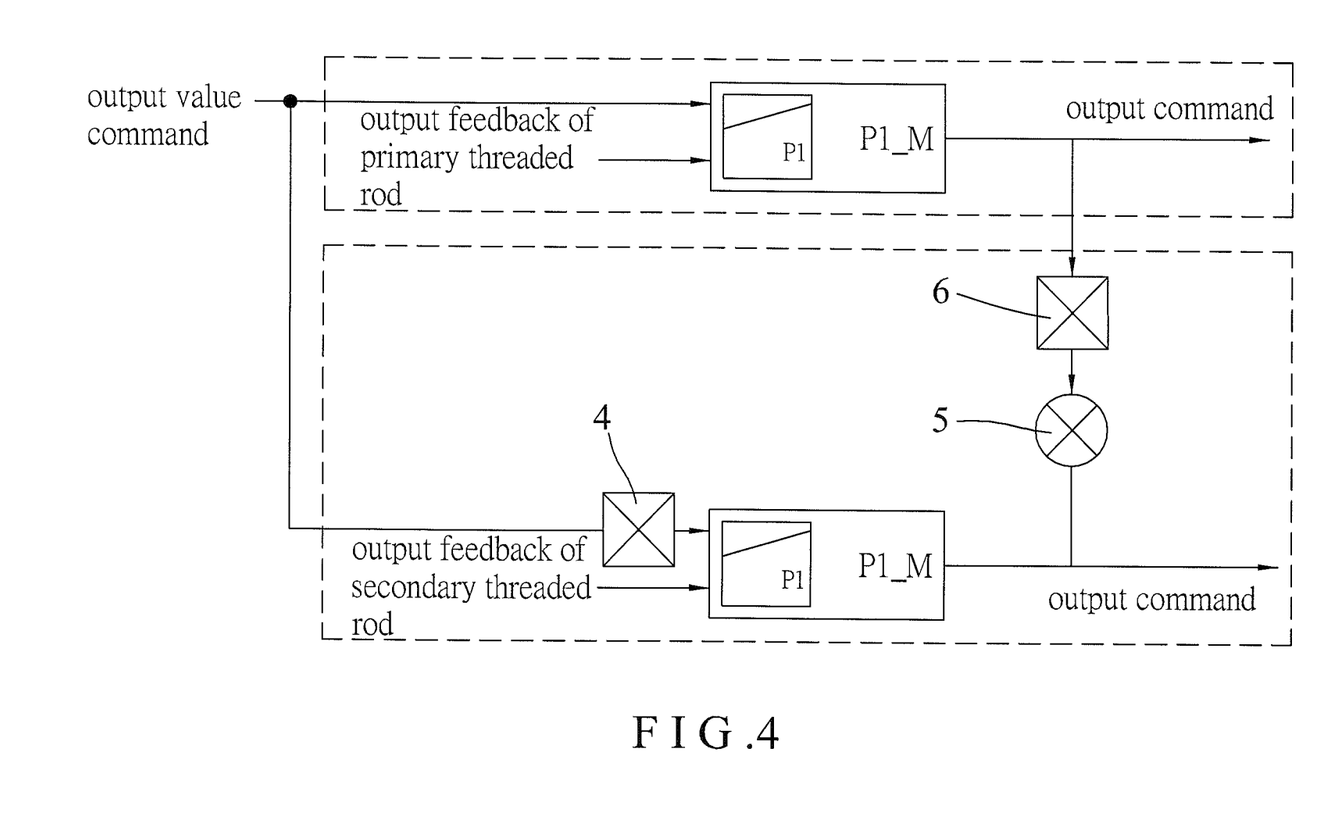
FIG. 4 is a schematic operational flow chart of the injection molding machine as shown in FIG. 2.

The bias factor command 4 decreases a rotation speed of the secondary motorized cylinder 12 when the rotation speed of the secondary motorized cylinder 12 is greater than that of the primary motorized cylinder 11 so that the normal torque output of the secondary motorized cylinder 12 is close to that of the primary motorized cylinder 11. On the contrary, the bias factor command 4 increases a rotation speed of the secondary motorized cylinder 12 when the rotation speed of the secondary motorized cylinder 12 is smaller than that of the primary motorized cylinder 11 so that the normal torque output of the secondary motorized cylinder 12 is close to that of the primary motorized cylinder 11. The bias factor command 4 contains an bias factor. The bias factor of the bias factor command 4 includes a ratio of the position, torque and speed of the primary motorized cylinder 11 and the secondary motorized cylinder 12. When the primary motorized cylinder 11 and the secondary motorized cylinder 12 produce a connection breakdown due to an external force, operation of the secondary motorized cylinder 12 is stopped by the bias factor of the bias factor command 4 so that the secondary motorized cylinder 12 is inoperative.

The preset output command 5 limits the normal torque output of the secondary motorized cylinder 12 so as to prevent the normal torque output of the secondary motorized cylinder 12 from being greater than that of the primary motorized cylinder 11.

The injection molding machine further comprises a die assembly 2 connected with the power device 1. The die assembly 2 includes a crank linkage 22 connected with the movable plate 13 of the power device 1, and a movable mold board 21 connected with the crank linkage 22. The crank linkage 22 of the die assembly 2 has a first side pivotally connected with the movable plate 13 of the power device 1 and a second side connected with the movable mold board 21.

Figure 3:
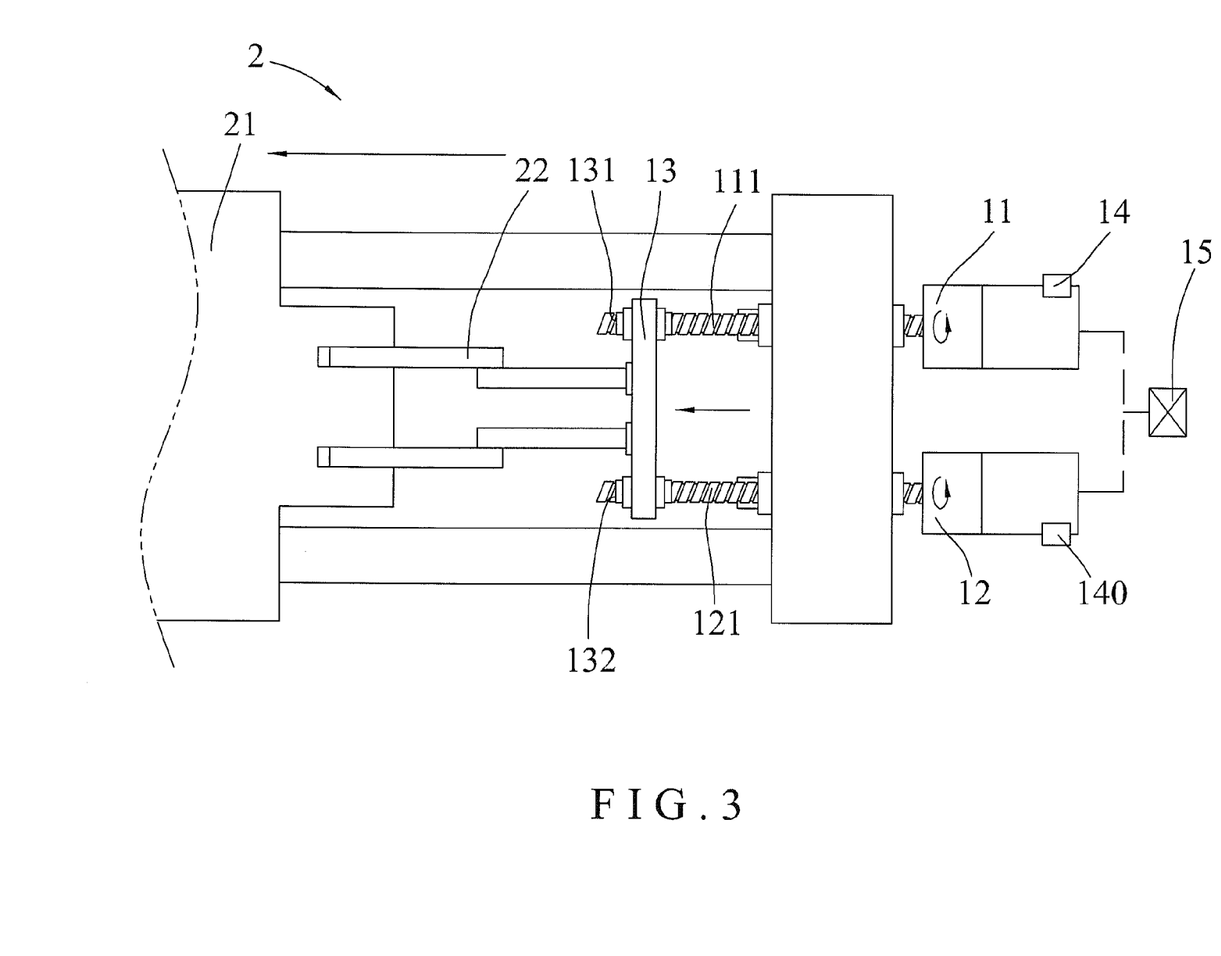
FIG. 3 is a schematic operational view of the injection molding machine as shown in FIG. 2.
Figure 5:
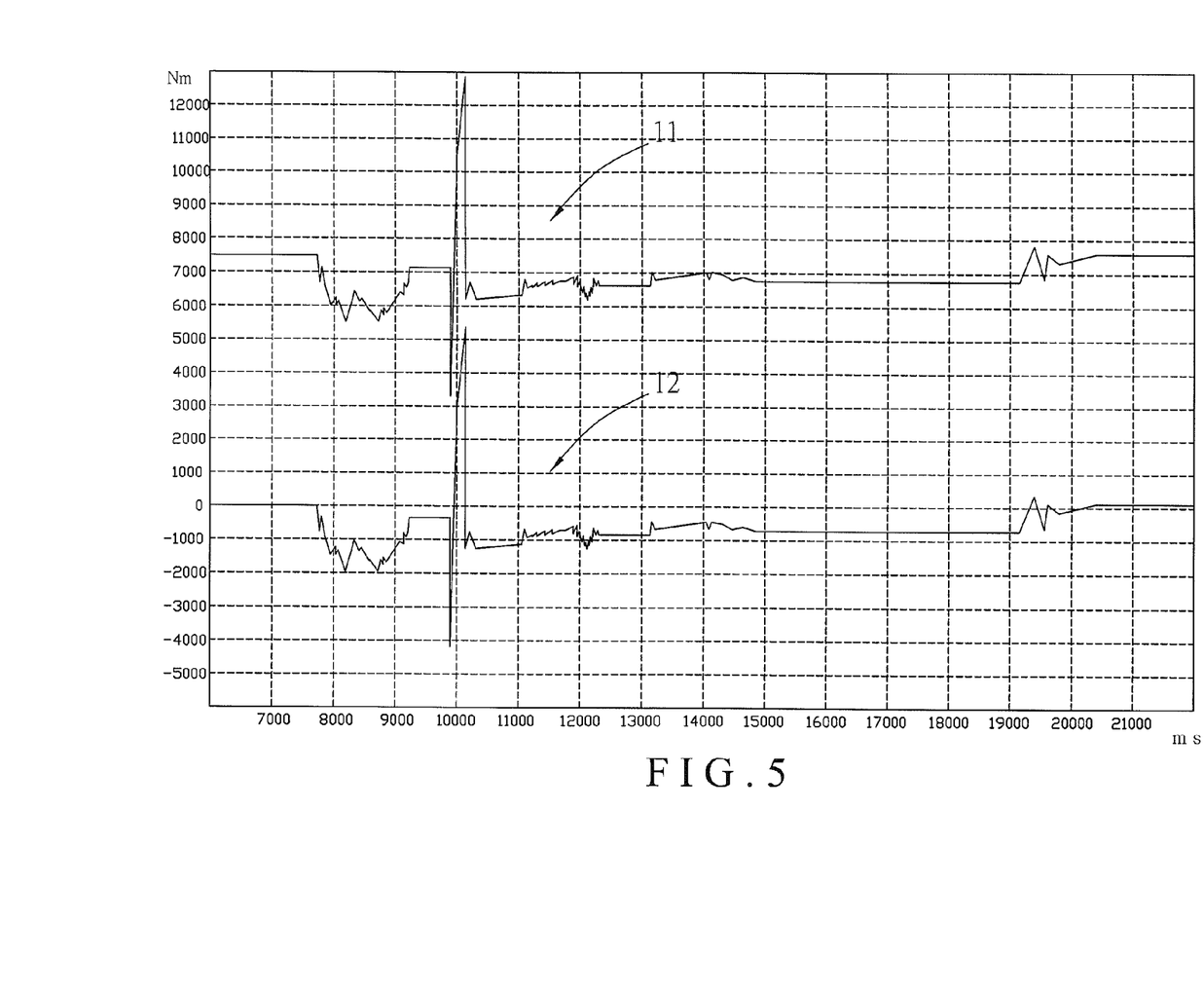
FIG. 5 is a graph showing the torque of the primary motorized cylinder and the secondary motorized cylinder of the injection molding machine as shown in FIG. 2.

In operation, referring to FIGS. 2 and 3 with reference to FIGS. 4 and 5, the first starter 14 and the second starter 140 are driven by the controller 15 respectively to start the primary motorized cylinder 11 and the secondary motorized cylinder 12 so as to rotate the primary threaded rod 111 and the secondary threaded rod 121. In such a manner, the movable plate 13 is moved by rotation of the primary threaded rod 111 of the primary motorized cylinder 11 and the secondary threaded rod 121 of the secondary motorized cylinder 12 to drive the crank linkage 22 which drives the movable mold board 21 so that the movable mold board 21 is moved relative to a fixed mold board (not shown) so as to close or open the die assembly 2.

When the controller 15 transmits a command to the first starter 14 and the second starter 140, the controller 15 also transmits the bias factor command 4 to the second starter 140 to control the normal torque output of the secondary motorized cylinder 12. In such a manner, the bias factor command 4 decreases the rotation speed of the secondary motorized cylinder 12 when the rotation speed of the secondary motorized cylinder 12 is greater than that of the primary motorized cylinder 11 so that the normal torque output of the secondary motorized cylinder 12 is close to that of the primary motorized cylinder 11. On the contrary, the bias factor command 4 increases the rotation speed of the secondary motorized cylinder 12 when the rotation speed of the secondary motorized cylinder 12 is smaller than that of the primary motorized cylinder 11 so that the normal torque output of the secondary motorized cylinder 12 is close to that of the primary motorized cylinder 11. Then, the controller 15 transmits the preset output command 5 to the second starter 140 to limit the normal torque output of the secondary motorized cylinder 12 so as to prevent the normal torque output of the secondary motorized cylinder 12 from being greater than that of the primary motorized cylinder 11. In such a manner, the primary motorized cylinder 11 and the secondary motorized cylinder 12 reach the same normal torque output so that the primary threaded rod 111 of the primary motorized cylinder 11 and the secondary threaded rod 121 of the secondary motorized cylinder 12 have the same normal torque output to prevent the movable plate 13 from being deflected during rotation of the primary threaded rod 111 of the primary motorized cylinder 11 and the secondary threaded rod 121 of the secondary motorized cylinder 12. Thus, the movable plate 13 is driven by the primary threaded rod 111 of the primary motorized cylinder 11 and the secondary threaded rod 121 of the secondary motorized cylinder 12 to translate to a preset position precisely and quickly so that the die assembly 2 is opened or closed exactly and steadily.

On the other hand, when the primary motorized cylinder 11 and the secondary motorized cylinder 12 produce a connection breakdown due to an external force, operation of the secondary motorized cylinder 12 is stopped by the bias factor of the bias factor command 4 so that the secondary motorized cylinder 12 is inoperative.

The operation formula of the bias factor command 4 is expressed by the following equation.

$$N_{bias} = f_{bias} \times n_{set}$$

The $N_{bias}$ is the bias factor command 4, the $f_{bias}$ is the bias factor, and the $n_{set}$ is the set output command.

The operation formula of preset output command 5 is expressed by the following equation.

$$M_{slave} = i_{master}/i_{slave} \times M_{master\_M} \times f_{load}$$

The $M_{slave}$ is the output of the secondary motorized cylinder 12, the $i_{master}$ is the current of the first starter 14 of the primary motorized cylinder 11, the $i_{slave}$ is the current of the second starter 140 of the secondary motorized cylinder 12, the $M_{master\_M}$ is the output of the primary motorized cylinder 11, and the $f_{load}$ is a load factor 6 (see FIG. 4). The load factor 6 includes an operation error of the primary threaded rod 111 of the primary motorized cylinder 11 or the secondary threaded rod 121 of the secondary motorized cylinder 12.

As shown in FIG. 5, a graph of the torque of the primary motorized cylinder 11 and the secondary motorized cylinder 12 is drafted, wherein the horizontal coordinate indicates the time, and the vertical coordinate indicates the distance of displacement. The unit of the time is millisecond (ms), and the unit of the distance of displacement is nanometer (Nm). It is clear that the normal torque output values of the primary motorized cylinder 11 and the secondary motorized cylinder 12 have little difference.

Accordingly, the controller 15 controls the primary motorized cylinder 11 and the secondary motorized cylinder 12 to operate synchronously and to have the same normal torque output. In addition, the normal torque output of the secondary motorized cylinder 12 is close to that of the primary motorized cylinder 11 by control of the bias factor command 4, and the preset output command 5 limits and prevents the normal torque output of the secondary motorized cylinder 12 from being greater than that of the primary motorized cylinder 11, so that the movable plate 13 is driven by the primary threaded rod 111 of the primary motorized cylinder 11 and the secondary threaded rod 121 of the secondary motorized cylinder 12 to translate to a preset position precisely and quickly so that the die assembly 2 is opened or closed exactly and steadily. Further, the normal torque output values of the primary motorized cylinder 11 and the secondary motorized cylinder 12 are controlled easily by the controller 15.

Figure 6:
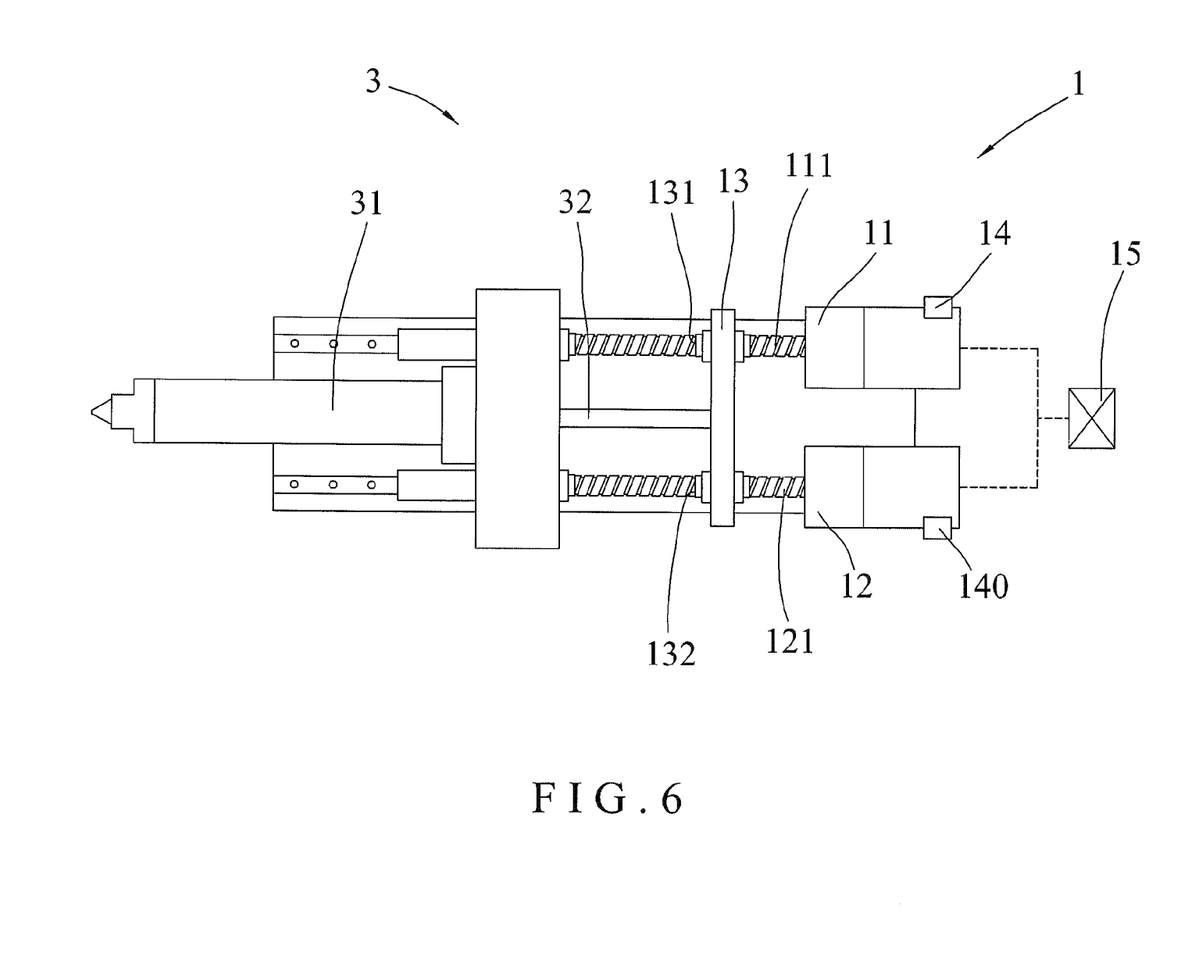
FIG. 6 is a plane view of an injection molding machine in accordance with another preferred embodiment of the present invention.
Figure 7:
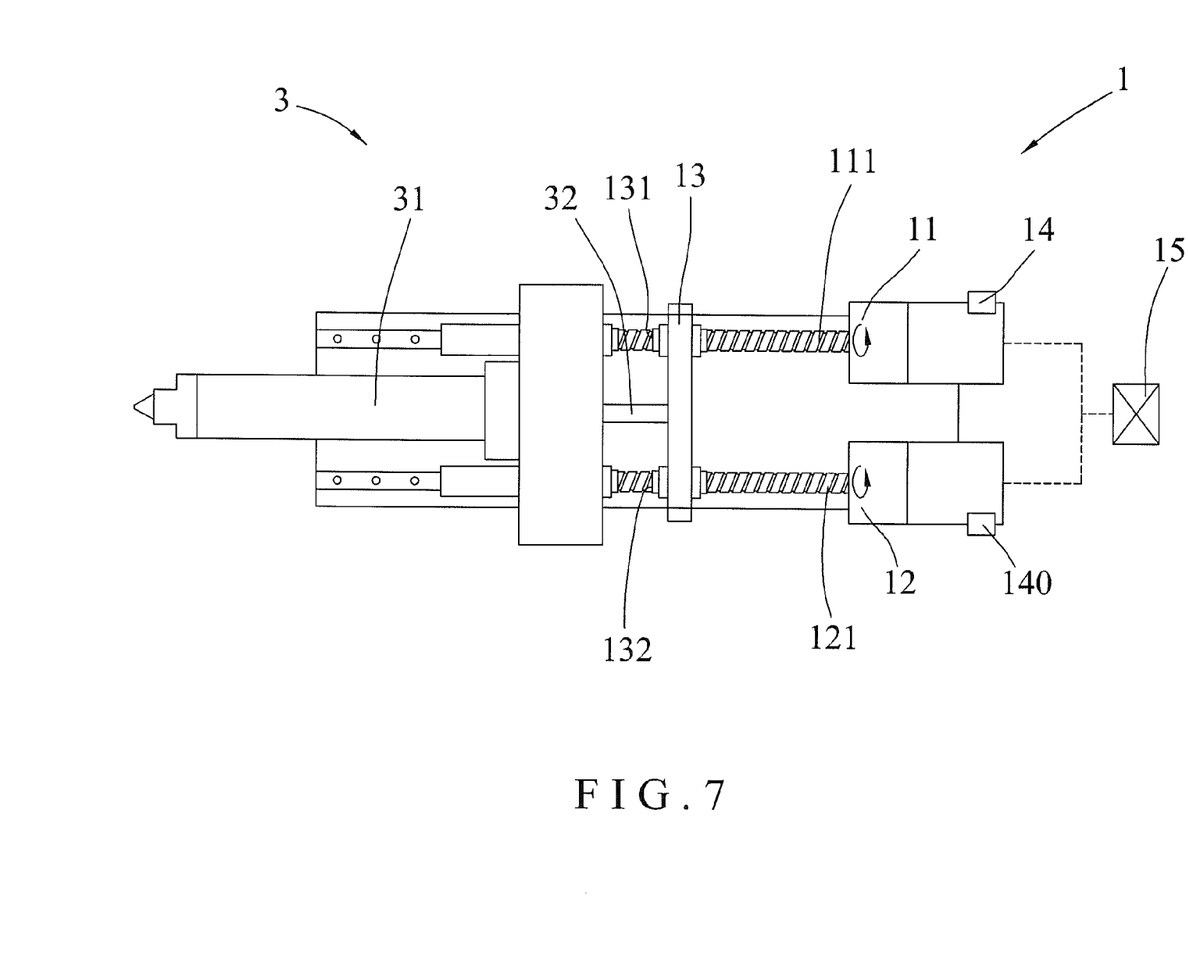
FIG. 7 is a schematic operational view of the injection molding machine as shown in FIG. 6.

Referring to FIGS. 6 and 7, the injection molding machine further comprises an injection mold assembly 3 connected with the power device 1. The injection mold assembly 3 includes a feed tube 31, and a thrust rod 32 connected between the feed tube 31 and the movable plate 13 of the power device 1. The thrust rod 32 of the injection mold assembly 3 has a first side pivotally connected with the movable plate 13 of the power device 1 and a second side retractably mounted in the feed tube 31.

In operation, the first starter 14 and the second starter 140 are driven by the controller 15 respectively to start the primary motorized cylinder 11 and the secondary motorized cylinder 12 so as to rotate the primary threaded rod 111 and the secondary threaded rod 121. In such a manner, the movable plate 13 is moved by rotation of the primary threaded rod 111 of the primary motorized cylinder 11 and the secondary threaded rod 121 of the secondary motorized cylinder 12 to drive the thrust rod 32 so that the thrust rod 32 is moved in the feed tube 31 to feed and guide the material in the feed tube 31.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An injection molding machine comprising:
a power device; wherein:
the power device includes:
a movable plate having a first screw hole and a second screw hole;
a primary motorized cylinder having a primary threaded rod screwed through the first screw hole of the movable plate;
a secondary motorized cylinder having a secondary threaded rod screwed through the second screw hole of the movable plate;
a first starter mounted on the primary motorized cylinder and electrically connected with a controller; and
a second starter mounted on the secondary motorized cylinder and electrically connected with the controller;
the second starter of the secondary motorized cylinder contains a bias factor command and a preset output command to control a normal torque output of the secondary motorized cylinder; and
the bias factor command and the preset output command of the second starter are added and controlled by the controller.

2. The injection molding machine of claim 1, wherein:
the injection molding machine further comprises a die assembly connected with the power device;
the die assembly includes:
a crank linkage connected with the movable plate of the power device; and
a movable mold board connected with the crank linkage;
the crank linkage of the die assembly has a first side pivotally connected with the movable plate of the power device and a second side connected with the movable mold board.

3. The injection molding machine of claim 1, wherein:
the injection molding machine further comprises an injection mold assembly connected with the power device;
the injection mold assembly includes:
a feed tube; and
a thrust rod connected between the feed tube and the movable plate of the power device;
the thrust rod of the injection mold assembly has a first side pivotally connected with the movable plate of the power device and a second side retractably mounted in the feed tube.

4. The injection molding machine of claim 1, wherein the bias factor command decreases a rotation speed of the secondary motorized cylinder when the rotation speed of the secondary motorized cylinder is greater than that of the primary motorized cylinder so that the normal torque output of the secondary motorized cylinder is close to that of the primary motorized cylinder.

5. The injection molding machine of claim 1, wherein the bias factor command increases a rotation speed of the secondary motorized cylinder when the rotation speed of the secondary motorized cylinder is smaller than that of the primary motorized cylinder so that the normal torque output of the secondary motorized cylinder is close to that of the primary motorized cylinder.

6. The injection molding machine of claim 1, wherein the preset output command limits the normal torque output of the secondary motorized cylinder so as to prevent the normal torque output of the secondary motorized cylinder from being greater than that of the primary motorized cylinder.

7. The injection molding machine of claim 1, wherein:
the bias factor command contains a bias factor; and
when the primary motorized cylinder and the secondary motorized cylinder produce a connection breakdown due to an external force, operation of the secondary motorized cylinder is stopped by the bias factor of the bias factor command so that the secondary motorized cylinder is inoperative.

* * * * *